United States Patent [19]

Kennedy

[11] 4,218,680
[45] Aug. 19, 1980

[54] CODED COHERENT TRANSPONDER

[75] Inventor: Peter D. Kennedy, Mesa, Ariz.

[73] Assignee: Motorola, Inc., Schaumburg, Ill.

[21] Appl. No.: 2,821

[22] Filed: Jan. 12, 1979

[51] Int. Cl.$^2$ ............................................. G01S 9/56
[52] U.S. Cl. ............................................. 343/6.8 R
[58] Field of Search ....................... 343/6.8 R, 6.8 LC

[56] References Cited

U.S. PATENT DOCUMENTS

| 2,890,449 | 6/1959 | Pickles et al. | 343/6.8 R X |
|---|---|---|---|
| 3,654,554 | 4/1972 | Cook | 343/6.8 R X |
| 3,716,856 | 2/1973 | Beguin | 343/6.8 LC |
| 3,964,024 | 6/1976 | Hutton et al. | 343/6.8 LC X |
| 3,996,587 | 12/1976 | Rosen | 343/6.8 R |
| 4,075,632 | 2/1978 | Baldwin et al. | 343/6.8 R |
| 4,114,151 | 9/1978 | Denne et al. | 343/6.8 R X |

Primary Examiner—T. H. Tubbesing
Attorney, Agent, or Firm—Eugene A. Parsons

[57] ABSTRACT

A transponder including a receiver and transmitter for receiving an interrogation signal and transmitting a coherent response with circuitry for modulating the coherent response to include a predetermined coded complex phase and/or amplitude shift therein to convey information, such as the identity of the transponder.

7 Claims, 6 Drawing Figures

CODED COHERENT TRANSPONDER

BACKGROUND OF THE INVENTION

1. Field of the Invention

The present invention relates to coherent signal transponders used in conjunction with pulse Doppler radars equipped for spectral analysis of the received signals. Surveillance radars and the like can be equipped with means for detailed analysis of the spectra of Doppler frequency components in the received signal. This capability is useful, for example, in separating the echos of moving objects such as vehicles and aircraft from the echos of fixed terrain features and in evaluating the velocities of such moving objects. This capability for radar signal analysis is very flexible and versatile if the apparatus affords a simultaneous measurement of many subdivisions of the Doppler frequency spectrum. Such a measurement can be performed by passing the video signal from the radar through a bank of bandpass filters having center frequencies spaced throughout the Doppler frequency range, or by performing a fast Fourier transform analysis of the radar's video signal. Functionally, such processes have a multiplicity of outputs, each of which indicates the signal strength in a certain portion of the Doppler frequency range. If the radar is observing only terrain features and vegetation, for example, only the lowest frequency terminals of the signal analyzer will show any significant outputs. If a moving object such as an aircraft or ground vehicle is observed by the radar, a signal will appear at the terminal of the signal analyzer that corresponds to the Doppler frequency generated by the velocity of this moving target.

With many forms of surveillance radars, transponders are used to either designate fixed locations on the ground or to identify moving targets of special significance. It is useful to code the signals of such beacons for identification or to transmit information from the transponder location to the radar operators. With simple pulse radars, such coding is applied by transmitting a series of pulses with a specific spacing in time between them.

2. Description of the Prior Art

In one type of prior art device, typified in U.S. Pat. No. 3,331,070, entitled "Radar Moving Target Simulator", and issued July 11, 1967, a device is constructed to receive a signal from a MTI radar and reflect back successive pulses to the MTI radar with each of the reflected successive pulses being phase shifted in time by a preselected amount to simulate a moving target. A similar type of device is disclosed in U.S. Pat. No. 3,716,856, entitled "Polarization Adaptive MTI Radar Transponder", issued Feb. 13, 1973. In both of these prior art devices the transponder or remote unit introduces a predetermined simple phase shift in the response to simulate a single signal having a given Doppler frequency shift. At the radar this return signal would appear as a moving target and could not be differentiated from actual moving targets in the area.

SUMMARY OF THE INVENTION

The present invention pertains to a coded coherent transponder with a receiver and a transmitter for receiving an interrogation signal from a pulse Doppler radar or the like and transmitting a coherent response including predetermined coded information, such as identification of the transponder, said transponder including circuitry for introducing a predetermined coded complex phase and/or amplitude shift into the coherent response. When the coherent response of the transponder is analyzed by the interrogating radar, it appears to consist of several components having certain Doppler frequencies and relative amplitudes. The apparent Doppler frequencies and their relative amplitudes constitute the unique identification of the transponder signal.

It is an object of the present invention to provide a new and improved coded coherent transponder.

It is a further object of the present invention to provide a new and improved coded coherent transponder wherein the coherent response is coded with a complex phase and/or amplitude shift to provide a unique indication at an interrogating radar.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the Figures.

DESCRIPTION OF THE PREFERRED EMBODIMENT

Before proceeding with the description of the present invention, the generation of modulated signals that will be interpreted by a coherent pulse Doppler radar as a combination of apparent Doppler signals will be reviewed briefly.

Figure 1:
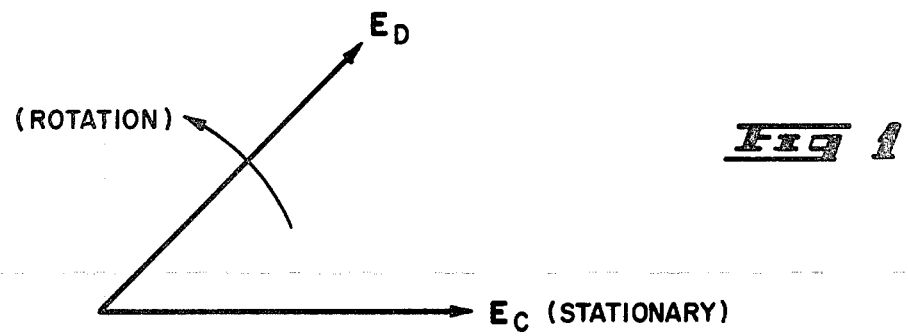
FIG. 1 is a phasor diagram representing two signals at different frequencies.

FIG. 1 illustrates a phasor diagram of a carrier signal, $E_c$ at frequency $f_c$, and a second carrier signal $E_d$ at a slightly different frequency $f_c + f_d$. According to the conventional construction of such diagrams, if the signals are viewed at a reference frequency corresponding to $f_c$, the phasor $E_c$ will be stationary at whatever angle represents its phase shift relative to the reference. Phasor $E_d$ will rotate, as shown, since its phase angle with respect to the reference changes continuously. The phasor $E_d$ will make one revolution in the interval of time that corresponds to the period of the frequency shift, $f_d$. Such a signal will occur in a coherent radar when the reflection from a steadily moving target is observed. With a pulsed radar the rotating phasor will be observed at discrete points in time, corresponding to the occurrence of the radar pulses.

Figure 2A:
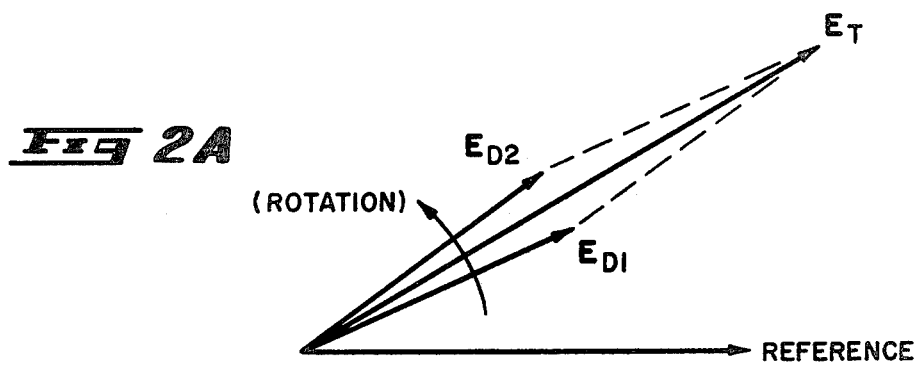
FIGS. 2A and 2B are phasor diagrams for two signals at different frequencies and at different instants of time.
Figure 2B:
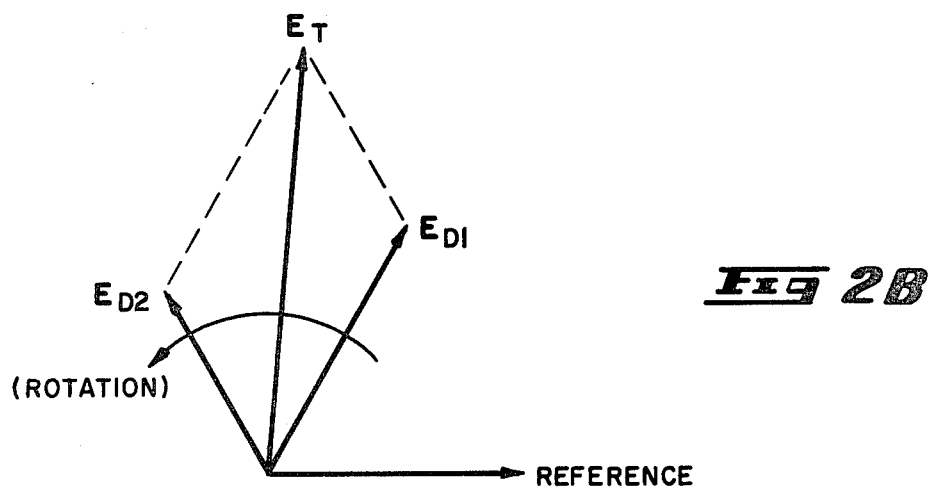

If two moving targets with different velocities are observed by the coherent radar simultaneously, the situation illustrated by FIGS. 2A and 2B occurs. Two received signals, $E_{d1}$ at frequency $f_{d1} + f_c$ and $E_{d2}$ at frequency $f_{d2} + f_{d1}$, are present. FIG. 2A shows the relative positions of the phasors $E_{d1}$ and $E_{d2}$ at one particular instant of time, and the total signal, $E_t$, is represented as the sum of the two phasors. FIG. 2B shows the phasors at a later instant, for example, at the time of the next radar pulse. In this example, $f_{d2}$ is greater than $f_{d1}$ so that phasor $E_{d2}$ advances farther than $E_{d1}$ in the time interval between FIGS. 2A and 2B.

Also, both frequencies $f_{d1}$ and $f_{d2}$ are higher than the reference frequency so that the signals advance in phase as time progresses. The total signal at the second instant (FIG. 2B) is again represented by the sum of the two components. A radar equipped for spectral analysis of the Doppler signals would indicate the simultaneous presence of $E_{d1}$ and $E_{d2}$ by exhibiting signals at the two corresponding output terminals. It will be understood by those skilled in the art that any other number of simultaneous signal components can be similarly represented and analyzed.

Figure 3:
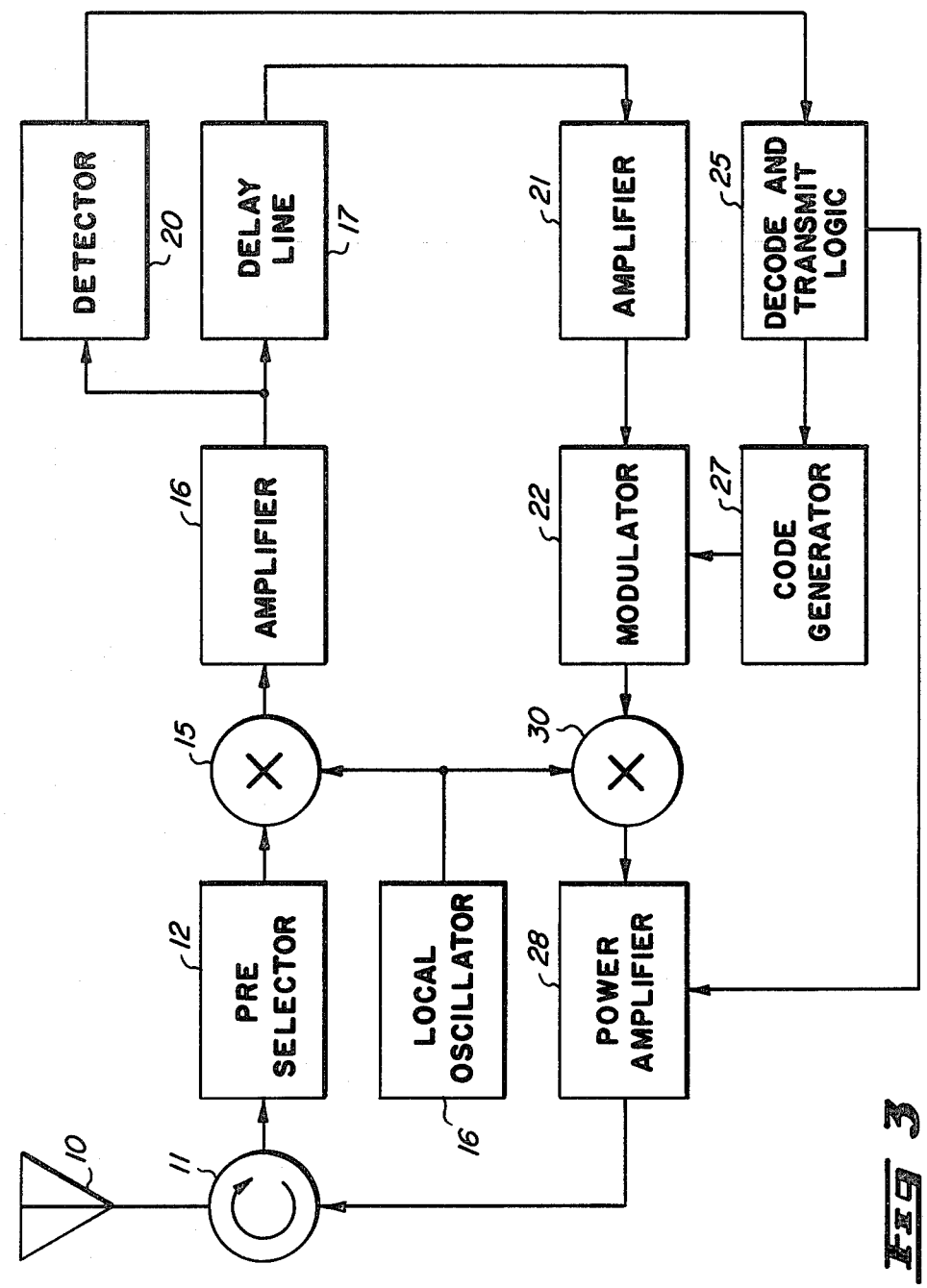
FIG. 3 is a block diagram of a coherent transponder embodying the present invention.

Referring specifically to FIG. 3, a block diagram of a transponder incorporating the present invention is illustrated. An antenna 10 is connected through a circulator 11 to a preselector filter 12 which is tuned to a desired radar frequency. The output of the filter 12 is connected to a mixer 15, which also has a local oscillator 16 connected thereto. The mixer 15 converts the radar signals from the filter 12 to a convenient intermediate frequency, which may typically be 60 megahertz. The output of the mixer 15 is connected through an amplifier 16 to a delay line 17 and detector 20. The output of the delay line 17 is connected through an amplifier 21 to a modulator 22. The output of the detector 20 is connected to decode and transmit logic 25, which has a first output connected to a code generator 27 and a second output connected to a power amplifier, or transmitter, 28. The code generator 27 is connected to control the modulator 22. The output of the modulator 22 is connected to a second mixer 30, which is also connected to the local oscillator 16 and converts the output signal of the modulator 22 back to the radar frequency and applies it to the power amplifier 28. The output of the power amplifier 28 is connected through the circulator 11 to the antenna 10.

In the operation of the apparatus illustrated in FIG. 3, the antenna 10 receives signals from an interrogating coherent pulse Doppler radar and these signals pass through the circulator 11 and preselector filter 12 to the mixer 15. The mixer 15 converts the radar frequency signals to an intermediate frequency and these signals are amplified and applied to delay line 17 and detector 20. The delay line 17 delays the signals by a time interval that is slightly longer than the radar pulse width to prevent interference with signal reception when the modified signal is retransmitted. The delayed signal then passes through the modulator 22 which modifies the phase and/or the amplitude of the signal in accordance with signals from the code generator 27. The output of the modulator 22 is converted back to the radar frequency by mixer 30 and retransmitted as a coherent signal. The amplifiers 16, 21 and 28 are used to maintain suitable signal levels throughout the system and more or less amplifiers may be used by those skilled in the art. The signal radiated by the antenna 10 will subsequently be received and analyzed by the interrogating radar.

Each pulse received by the antenna 10 and processed by the transponder is detected by the detector 20, which signals the decode and transmit logic 25 to control the code generator 27 and power amplifier 28. The code generator 27, in this embodiment, is a memory device in which is stored the sequence of modulator settings required to superimpose the desired code on the retransmitted signals. Each modulator setting will be recalled in turn from the memory device of the code generator 27 by the decode and transmit logic circuitry 25 so that it can be applied to the modulator 22.

From FIGS. 2A and 2B it can be seen that both the magnitude and the phase of the total signal, $E_t$, change from instant to instant (also pulse to pulse). These variations are, of course, completely predetermined by the frequencies, amplitudes, and relative phases (at some arbitrary starting point) of the components. Consequently, to provide a signal that is to be analyzed as consisting of two or more components requires modifications of some original reference signal which can be precalculated in terms of the required variations of the total signal and stored in the memory device of the code generator 27. Alternatively, the control signal for the modulator 22 could be generated by operating separate oscillators at the desired simulated Doppler frequencies (for example $f_{d1}$ and $f_{d2}$ in FIGS. 2A and 2B) and combining their outputs to produce the total signal. Other methods having equivalent results could be devised by those skilled in the art and are intended to come within the scope of this invention.

Figure 4:
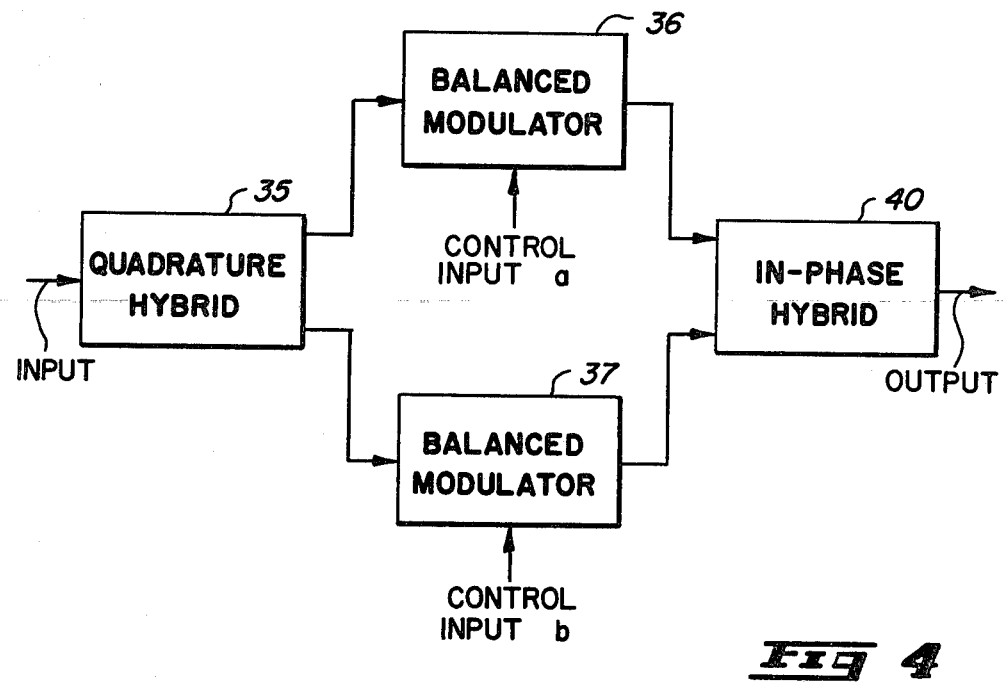
FIG. 4 is a block diagram of an alternate component for the transponder of FIG. 3.

Referring to FIG. 4, a modulator for controlling the phase and amplitude of an input signal is disclosed. The signal to be controlled, which in this embodiment is the output of amplifier 21, is applied to a quadrature hybrid 35 that splits the signal into an in-phase component and a quadrature component. The in-phase component from the hybrid 35 is applied to a balanced modulator 36, and the quadrature component is applied to a balanced modulator 37. The balanced modulators 36 and 37 each have a control input which receives signals from the code generator 27 and separately adjusts the in-phase and quadrature components. These adjusted components are then applied to an in-phase hybrid 40 which recombines the components to form the desired modulated signal at the output, which in this embodiment is applied to the mixer 30. Since the in-phase and quadrature components are 90° out of phase, any desired combination of phase and amplitude adjustment of the signal can be obtained by applying the appropriate combination of control signals to the balanced modulators 36 and 37.

Figure 5:
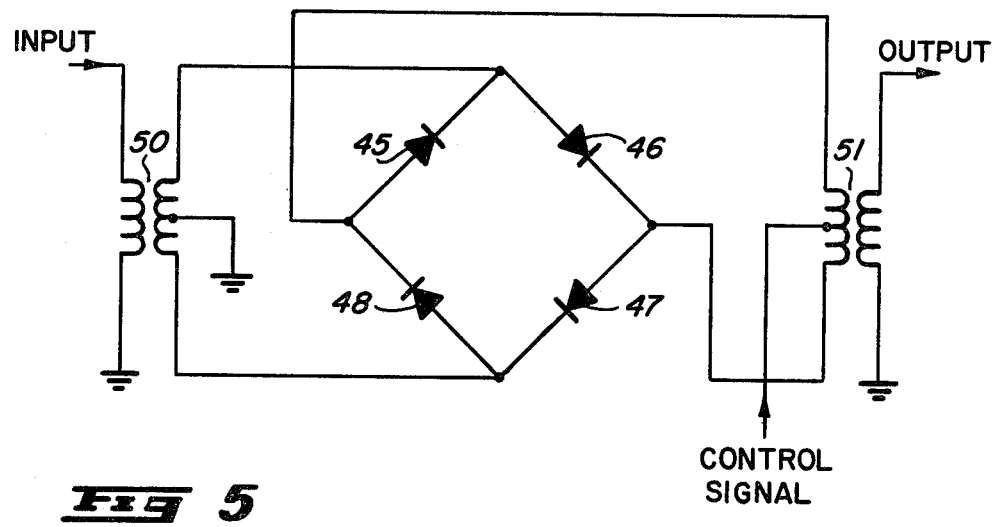
FIG. 5 is a schematic diagram of a portion of FIG. 4.

FIG. 5 illustrates a schematic diagram of a double balanced mixer, two of which may be utilized as the balanced modulators 36 and 37. In the mixer of FIG. 5 a bridge circuit is formed with four diodes 45 through 48 with all of the diodes connected anode to cathode. Two opposite corners of the bridge circuit are connected to opposite sides of a secondary winding of an input transformer 50, the primary winding of which is connected between an input terminal and ground. The other two opposite corners of the bridge circuit are connected to opposite sides of a primary winding of an output transformer 51, the secondary winding of which is connected between an output terminal and ground. The secondary winding of the input transformer 50 has a grounded center tap and the primary winding of the output transformer 51 has a center tap which is connected to receive the control signal from the code generator 27. In this mixer circuit, the control signal varies the resistances of the four diodes 45 through 48 so that a variable amount of the input signal is passed to the output terminal. The output signal also experiences a 180° phase shift as the control signal changes from plus to minus. Thus, complete control of the signals applied to the balanced modulators 36 and 37 is possible through this type of circuit. While a specific modulator 22 is illustrated and a specific balanced modulator (36 and 37) is illustrated, it should be understood that many other types of modulators could be devised by those skilled in the art without affecting the essential features and functions of the present invention.

Thus, an improved coherent signal transponder is disclosed wherein a complex signal is used to modulate or code the return signal before it is retransmitted to an interrogating radar. This coding includes a complex phase shift and/or a complex amplitude shift. While the embodiment disclosed utilizes a complex phase and amplitude shift to generate a multi-component signal, it should be understood that a useable approximation of the theoretically perfect result may be generated by using only one of the two forms of modulation, i.e., phase or amplitude shift. By coding the retransmitted signal of the transponder with a complex phase and/or amplitude shift, the return signal, when analyzed by the interrogating Doppler radar, will appear as a target moving at two or more velocities simultaneously. Because an actual target can only move at one velocity, a transponder coded in this fashion will not be confused with an actual target. Further, while a return signal with only two components modulated thereon has been described, it will be understood by those skilled in the art that any number of components may be included (limited only by the analyzer of the interrogating radar) and that the number of identifying codes is virtually limitless.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A coded coherent transponder with a receiver and a transmitter for receiving an interrogation signal and transmitting a coherent response including predetermined coded information, said transponder including means for introducing a predetermined coded complex phase shift into the coherent response representative of a simultaneous plurality of Doppler frequency components.

2. A coded coherent transponder as claimed in claim 1 wherein the transponder further includes means for introducing a predetermined amplitude shift into the coherent response.

3. A coded coherent transponder with a receiver and a transmitter for receiving an interrogation signal and transmitting a coherent response including predetermined coded information, said transponder including means for introducing a predetermined coded amplitude shift into the coherent response representative of a simultaneous plurality of Doppler frequency components.

4. A coded coherent transponder comprising:
   (a) a receiver for receiving an interrogation signal from a remotely positioned, pulsed radar;
   (b) delay means coupled to said receiver for delaying the interrogation signal;
   (c) phase shifting means coupled to said delay means for introducing a predetermined coded complex phase shift into the interrogation signal representative of a simultaneous plurality of Doppler frequency components; and
   (d) a transmitter coupled to receive the delayed and phase shift coded signal for transmitting a coherent coded response to the remotely positioned, pulsed radar, said delay means introducing sufficient delay to allow the reception of a substantially complete interrogation signal prior to transmission of the response.

5. A coded coherent transponder as claimed in claim 4 wherein the phase shifting means includes circuitry for dividing the interrogation signal into in-phase and quadrature components, first and second attenuators coupled to operate on the in-phase and quadrature components, respectively, in response to a code applied thereto, and circuitry for recombining the components into a resultant, phase shift coded signal.

6. A coded coherent transponder as claimed in claim 5 wherein each of the first and second attenuators includes a double-balanced diode mixer.

7. In a coherent transponder including a receiver and a transmitter for receiving an interrogation signal and transmitting a coherent response, a method of coding the response to represent predetermined data, said method comprising the steps of:
   (a) receiving the interrogation signal;
   (b) phase modulating the receiver signal in accordance with a predetermined code by introducing a predetermined complex phase shift into the signal to represent a plurality of simultaneous predetermined responses; and
   (c) transmitting the modulated signal.

* * * * *